United States Patent [19]

Yetter

[11] Patent Number: 5,765,209
[45] Date of Patent: Jun. 9, 1998

[54] METHOD AND APPARATUS TO ELIMINATE REDUNDANT MAPPING IN A TLB UTILIZING VARIABLE SIZED PAGES

[75] Inventor: Jeffry D. Yetter, Fort Collins, Colo.

[73] Assignee: Hewlett-Packard Co., Palo Alto, Calif.

[21] Appl. No.: 699,520

[22] Filed: Jul. 18, 1996

Related U.S. Application Data

[63] Continuation of Ser. No. 125,992, Sep. 23, 1993, abandoned.
[51] Int. Cl.$^6$ .............................. G06F 12/10; G06F 12/00
[52] U.S. Cl. ..................... 711/207; 711/200; 711/202; 711/205; 711/206; 711/203
[58] Field of Search ..................... 395/410, 412, 395/415, 416, 413, 403, 417, 401, 565

[56] References Cited

U.S. PATENT DOCUMENTS

| | | | |
|---|---|---|---|
| 4,356,549 | 10/1982 | Chueh | 395/400 |
| 4,577,274 | 3/1986 | Ho et al. | 395/400 |
| 4,899,275 | 2/1990 | Sachs et al. | 395/403 |
| 4,914,577 | 4/1990 | Stewart et al. | 395/400 |
| 5,133,058 | 7/1992 | Jensen | 395/400 |
| 5,263,140 | 11/1993 | Riordan | 395/400 |
| 5,327,372 | 7/1994 | Oka et al. | 365/49 |
| 5,375,214 | 12/1994 | Mirza et al. | 395/417 |
| 5,390,310 | 2/1995 | Welland | 395/413 |

Primary Examiner—David K. Moore
Assistant Examiner—Than V. Nguyen

[57] ABSTRACT

The present invention relates to computer systems utilizing a TLB with variable sized pages. This invention detects conflicts between address tags stored in the TLB and a prospective address tag. In particular this invention detects conflicts when the prospective tag represents an address space that overlaps, wholly includes or is included in the address space represented by a tag stored in the TLB. By detecting tag conflicts utilizing hardware, a tremendous performance gain is achieved over systems utilizing prior art software systems.

7 Claims, 8 Drawing Sheets

METHOD AND APPARATUS TO ELIMINATE REDUNDANT MAPPING IN A TLB UTILIZING VARIABLE SIZED PAGES

CROSS REFERENCE TO RELATED APPLICATION

This is a continuation of application Ser. No. 08/125,992 filed on Sep. 23, 1993, now abandoned.

FIELD OF THE INVENTION

The present invention relates to systems and methods for managing virtual memory in a computer system. More specifically, the present invention is directed to an apparatus and method for insuring that redundant mapping do not occur in a content addressable memory (CAM) used for a translation lookaside buffer (TLB) in a virtual memory system.

BACKGROUND

The trend since the beginning of the computer age is for computers to become significantly more powerful and complex with each passing year. With the continuing advances in the fabrication of integrated circuits, and advances in other related technologies, the next generation of digital computers will continue the trend.

While computer hardware has become considerably more powerful in recent years, those who write computer software, and those who purchase such software, are always desiring more powerful hardware. It can always be expected that a computer programmer's designs, and a user's expectations, will be somewhat limited by the capacity of available hardware. Thus, there is a need to provide computer systems which will meet or exceed the performance requirements of software and the expectations of the users.

The speed at which a computer is able to perform operations (millions of instruction per second "MIPS") and the memory space available to run programs are two major parameters often used to determine the relative power and performance of a computer system. The speed at which many computer systems are able to perform operations is often limited by the speed at which the computer's main memory may be accessed. Furthermore, computer systems that are limited by the size or performance of their memory are often characterized as being "memory bound". Because fast memory is relatively expensive, a balance must be reached between providing a large fast physical memory (main memory) and the cost of the system to the user. Therefore it is important that the fast memory that is available is efficiently used.

By using magnetic disk or tape drives, a vast amount of slow memory can be made available for use at a reasonable price. However, writing data to, and reading data from, these mechanical devices is a laboriously slow task (measured in milliseconds to seconds) compared to the speed of modern microprocessors which can perform an operation in 20 nanoseconds. Also, while the speed of microprocessors continues to become considerably faster each year, speed increases in the magnetic devices occur in small increments over a much longer period of time.

In most computer systems, a central processing unit (CPU) communicates with a main memory to obtain instructions (often referred to as code) and to read and write data. The CPU accesses a specific main memory location by generating an address and placing that address on an address bus and then sending data to or receiving data from the specified memory location on a data bus. As already mentioned, efficient use of main memory and the speed of the memory accesses are major factors affecting the performance of computer systems.

A memory management system, when incorporated into a digital computer, provides capabilities that allow more efficient use of main memory. These capabilities include the translation of virtual addresses assigned by the CPU (or other bus master) to physical addresses in main memory (discussed below), providing multiple segregated address spaces for different processes residing in the computer, and protecting certain memory areas by allowing only read, write, or execute operations on those areas.

In order to provide the processes (a single computer system may handle many separate processes) residing in a computer system with a large number of memory locations within which to operate, while keeping the number of physical memory locations within practical limits, a virtual memory scheme is often used. A virtual memory scheme is commonly one in which the number of memory locations (represented by "virtual addresses") available to a process is greater than the number of memory locations available in main memory (represented by "physical addresses"). Such virtual memory schemes make efficient use of main memory since any particular process only requires access to small groups of code or data (collectively called "data") for short periods of time.

Therefore, an important function of many memory management systems is providing virtual memory support. In this way, the CPU is allowed to access a larger virtual memory space than is in fact physically present in main memory. In other words, a program or a process may have available to it a virtual memory space much greater than the physical or real memory space available in main memory.

In computer systems implementing a virtual memory scheme, the total amount of memory available to a particular process, for example 1 billion bytes (1-GByte), is usually stored on a secondary storage device such as a magnetic disk drive. A smaller amount of random access memory (RAM), for example 1 million bytes (1-MBytes), is provided for the process in the main memory of the computer system. The data contained on the magnetic disk is moved into the limited space available in RAM as needed by the process. As the process finishes its use of a portion of data, that data is moved from the main memory to secondary storage and replaced by other data moved into the main memory.

This type of virtual memory scheme is carried out by dividing the total virtual memory space into many units called "pages". All of the pages for a process are stored on a secondary storage device, such as a magnetic disk. As pages of data are required by the CPU, they are moved into an area in the main memory.

Pages may remain in main memory or they may be moved back to secondary storage as determined by their frequency of usage and restrictions on the amount of available main (physical) memory. One usual function of a memory management system is to detect the CPU's attempts to access pages not currently present in main memory and causing the suspension of operation of the CPU until the page containing the demanded address has been moved into the main memory. The access by a CPU to a page not resident in main memory is called a "page fault" and a page fault handler, implemented in either hardware or software, is responsible for bringing the requested page into main memory.

For example, in a computer system having a memory management system where each page is the same size, each page may contain 2048 bytes. The individual memory locations (bytes) in a page typically are sequentially designated 0, 1, . . . , 2047. A process generally accesses data stored in contiguous memory locations. That is, most processes would first access location 0, then location 1 . . . .

When the CPU requires data stored in location 0, the entire page of data (bytes 0–2047) is moved from secondary storage to the main memory. This transfer of data is quite slow and during the transfer time the process the CPU was executing is suspended. The page moved from the secondary storage can be stored anywhere within the main memory and the task of storing and keeping track of where the page is stored is called "mapping".

Once the page of data has been moved into the main memory, the CPU can access any of the bytes in the page, typically in sequential order, as required. Then if required, the CPU would cause the next page of data to be moved into the main memory where the CPU would be able to access the bytes in the new page. This process of bringing in new pages can continue until the main memory no longer has any space left for an additional page. At that point, a page in main memory will be "swapped" to the secondary storage device and the new page will reside where the swapped page was located in main memory.

A typical method of determining which pages are contained in main memory, and the location of those pages, at any instant in time, is by the use of a memory structure termed a translation table. When a page is brought into main memory, the location of the page is "entered" into the translation table. The translation table consists of ordered pairs of virtual addresses and physical addresses (other information not relevant to this discussion is also typically stored in the table).

A specialized memory management system translates the virtual addresses generated by the CPU to a corresponding physical address in the main memory. This is typically performed by using a bit pattern (TAG) of the virtual address to select an entry in the translation table. The selected entry is then used to find the associated physical location in main memory. While there are many ways known in the art to organize the memory management system, a convenient way is to use a fully associative translation lookaside buffer.

The associative translation lookaside buffer (TLB) is generally a small content addressable memory (CAM), containing a limited number of entries. The TLB is usually situated on or in close proximity to the processor unit and stores recently used pairs of virtual and physical addresses. The TLB contains a subset of the translations in the page table and can be accessed much more quickly. When the processing unit needs information from the main memory, it sends the virtual address to the TLB. The TLB accepts the virtual address page number and returns a physical page number.

Each entry is comprised of a tag and a pointer to the start of a page in main memory. A virtual address generated by the CPU is compared simultaneously to each of the tags stored in the TLB. If a matching translation entry is found, the corresponding pointer to main memory is used as the physical address for the desired page. If no match is found, then a TLB miss occurs and the TLB is updated as required.

In most cases the TLB cannot contain the entire page table so procedures need to be implemented to update the TLB. When a virtual page is accessed and the translation is not in the TLB, the page table is accessed to determine the translation of this virtual page number to a physical page number and the translation information is entered in the TLB. Access to the page table can take twenty times longer than access to the TLB and therefore program execution speed is optimized by keeping the translations being utilized in the TLB. If the required translation is not in the page table, then a page fault occurs and a page fault program is called to update the page table and the TLB.

For a virtual memory system to work properly, the TLB entries must be unique. That is, no two entries in the TLB can have the same virtual address. In systems utilizing pages having a fixed size, the uniqueness rule is enforced by comparing the prospective new entry to the entries already in the TLB. If a match is detected, then the entry already in the TLB is used and the prospective new entry is discarded. However, if the prospective new entry is unique to the current TLB entries, then the new entry is inserted into the TLB.

Enforcing the uniqueness rule (virtual addresses are disjoint) in systems utilizing variable sized page entries is a much more difficult problem. The prospective new TLB entry can be identical to a current TLB entry in which case the process discussed above is used to assure uniqueness. However, the prospective new TLB entry can be a subset or superset of a current TLB entry and therefore a simple compare operation will not work.

Prior art systems utilize complex software programs to determine if the prospective new entry contains, or is contained in, a current TLB entry. These programs require considerable time to determine if a conflict exists in the TLB during the update process and therefore negatively impact the overall performance of the computer system. Since the use of variable sized pages is desirable for performance reasons, an apparatus and method for quickly determining conflicts during TLB updates in systems utilizing variable sized pages is highly advantageous and needed in the industry.

SUMMARY OF THE INVENTION

The present invention quickly tests for conflicts between a prospective TLB entry and the current entries in the TLB. By utilizing new and novel hardware, all current TLB entries are tested against the prospective TLB entry to detect either a current TLB entry which is wholly contained in the prospective TLB entry or a larger TLB entry which contains the prospective entry. In addition, this conflict test is performed with a single access to the TLB thereby providing a fast conflict detection apparatus.

All entries in the TLB are compared simultaneously with the prospective TLB entry. The number of bits of the prospective TLB entry used in the comparison are adjusted by a mask based on the size of page the prospective TLB entry represents. Bits of the prospective TLB which are masked out are not used in the comparison. Each TLB entry also has an associated mask which masks lower order bits based on the size of the TLB entry. A masked bit is excluded from the comparison process. Large sized (multiple of the minimum page size) TLB entries will have more of the less significant virtual page identification bits masked out than a smaller sized TLB entries. So when comparing a prospective TLB entry to the entries already present in the TLB, fewer bits need to be compared for a large sized TLB entry than for a smaller TLB entry to detect a conflict with the prospective entry.

In addition, a mask function is associated with the prospective tag. The mask functions to mask out lower order bits of the prospective tag. This masking of bits allows for comparing prospective tags representing variable size pages.

The bits not masked are active bits and the masked bits are ignored for comparison purposes.

The conflict detection apparatus compares the active bits in the prospective TLB entry against the active bits (not masked) in each of the TLB entries simultaneously. If the bit pattern in the prospective entry and the active bit pattern of at least one of the TLB entries match, a conflict signal is generated.

By utilizing this new method and apparatus, all entries in a TLB are compared quickly in a single access eliminating the need for the time consuming software comparison programs used in prior art computer systems.

BRIEF DESCRIPTION OF THE DRAWINGS

FIG. 3 is comprised of partial FIGS. 3A and 3B which in combination illustrate a comparator circuit for detecting tag conflicts a TLB utilizing fixed page sizes, wherein FIG. 4 is comprised of partial FIGS. 4A and 4B which in combination illustrate a preferred embodiment of the present invention for detecting tag conflicts in a TLB utilizing variable memory page sizes, wherein

DETAILED DESCRIPTION OF THE INVENTION

In order to better understand the present invention, four drawings will be described. The first drawing shows a simplified view of how a TLB as used in a computer system. The second and third drawings illustrate a TLB tag comparator process and circuit. A preferred comparator circuit is illustrated in the forth drawing. The circuits illustrated in FIGS. 3 and 4 form a part of the TLB that relates to the invention. Other parts of the TLB are omitted for clarity and are well understood by those skilled in the art. The first circuit (FIG. 3) is the basic comparator circuitry used by the present invention to compare all entries in the TLB in parallel. An understanding of the basic comparator circuitry will aid the reader in understanding a preferred embodiment of the present invention as illustrated in the forth drawing.

Figure 1:
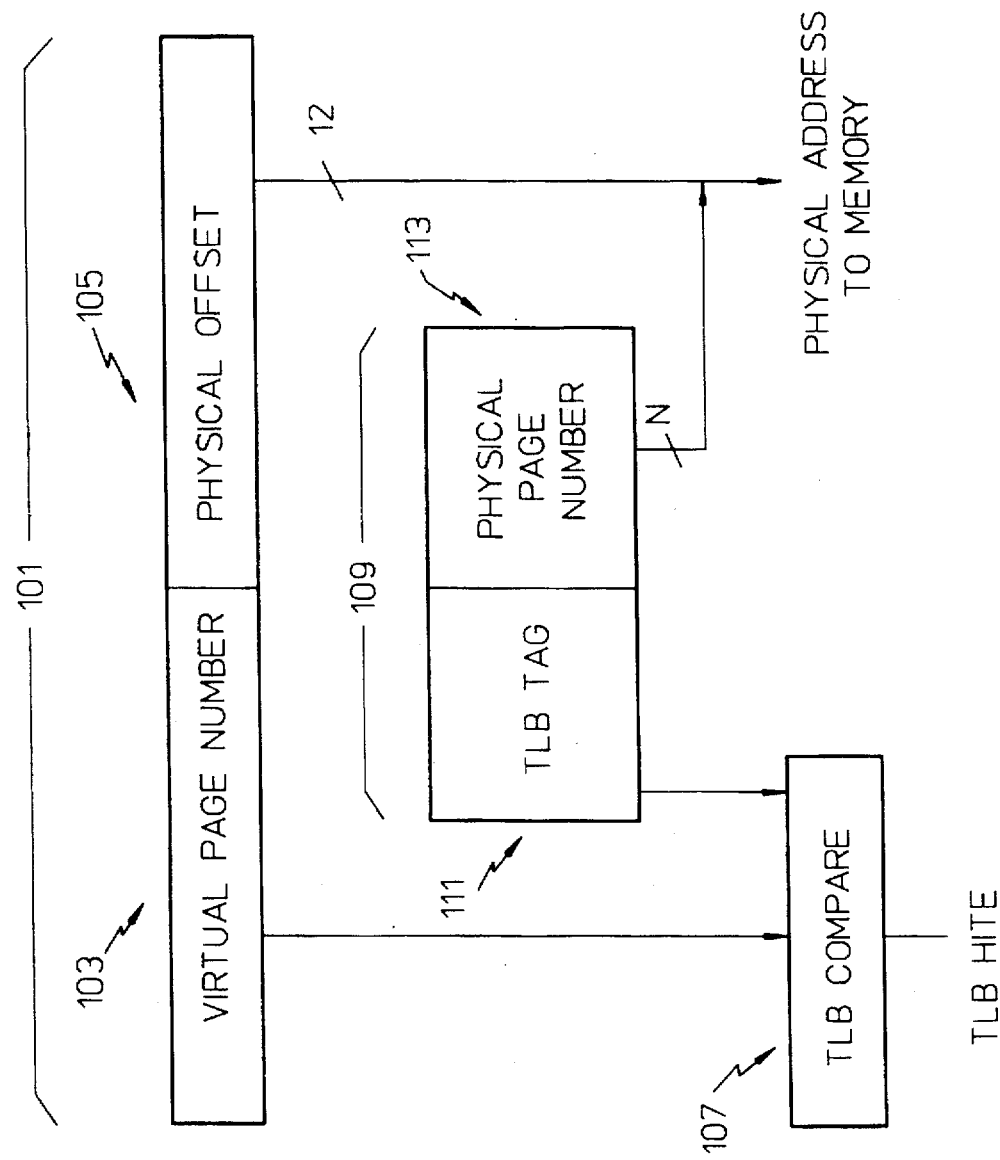
FIG. 1 illustrates a block diagram of a computer addressing system utilizing a TLB.

FIG. 1 illustrates a simplified method of using a TLB. For illustration purposes, the illustrated TLB has only one entry whereas a TLB would normally have many more entries. A virtual address is loaded in a computer register 101. This virtual address is composed of two parts, a virtual page number 103 and a physical offset 105. The physical offset 105 is normally the low order bits (bits 11–0 shown) which specify a particular byte within a page. The remaining bits in the register indicate the virtual page number.

For the example illustrated, the virtual page number becomes a virtual tag which supplies one input for a TLB comparator 107. A TLB entry 109 has two linked parts, a TLB tag 111 (the tag is the virtual address) and an associated physical page number 113. The TLB tag 111 supplies the second input to the TLB comparator 107 and the comparator compares the TLB tag to the virtual tag. If the tags match, then the comparator indicates a TLB hit and the physical page number 213 is combined with the physical offset 105 to provide the (real) memory address. This memory address is used by the computer to read or write data into the memory as required. If the tags do not match, then there has been a TLB miss and a TLB miss process must be used to update the TLB.

Figure 2:
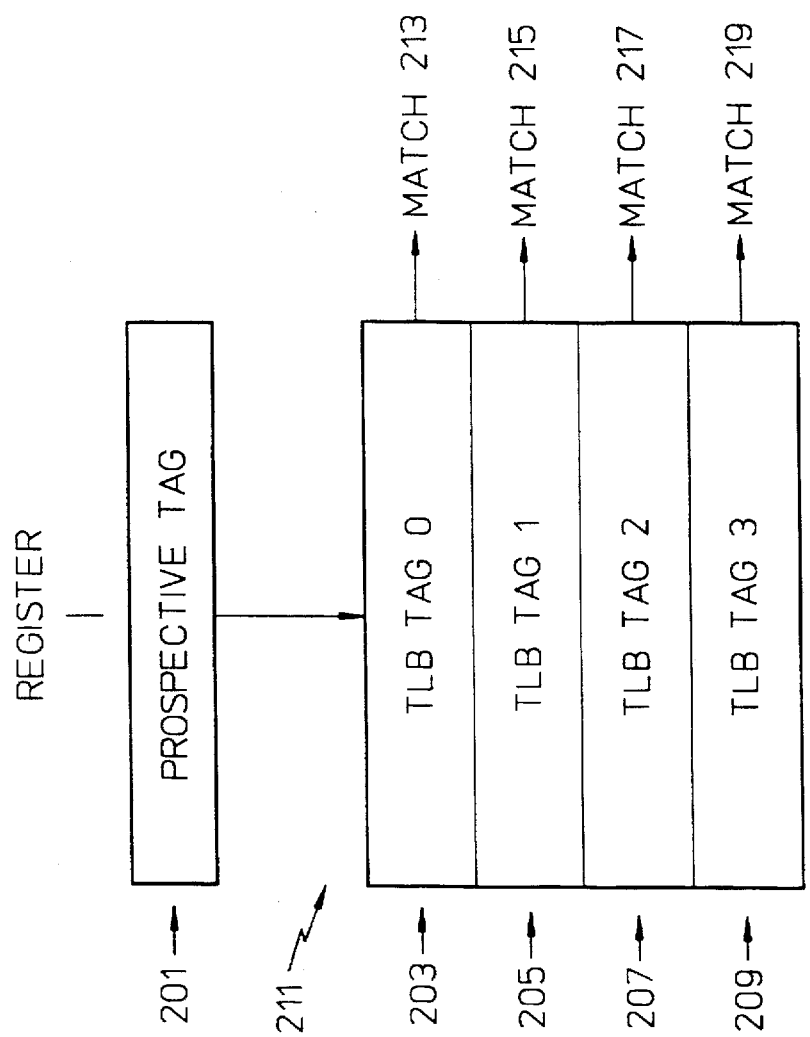
FIG. 2 illustrates the process of comparing a prospective tag to tags currently in a TLB.

When a TLB is to be updated, all entries in the TLB must be compared with a prospective entry to detect possible conflicts. This conflict test is performed by comparing the TLB tag data to the tag of the prospective entry. FIG. 2 is a simplified diagram illustrating the comparison of all TLB tags to the tag of the prospective entry.

As illustrated in FIG. 2, a prospective tag 201 is compared to four TLB tags 203–209 stored in a TLB tag comparator 211. The TLB tag comparator compares all the TLB tags 203–209 (tag 0–tag 3) to the prospective tag 201 simultaneously. If a match is detected, the comparator will output a signal on one of four match lines 213–219 (match 0–match 3) which are in a one-to-one correspondence with the TLB tags 203–209. For example, if the prospective tag 201 matches TLB tag 2 (207), then the match 2 line 217 will signal a match.

Once a match is detected, the TLB tag that matched with the prospective tag will be replaced. Methods to update TLBs are well known by those skilled in the art and will not be detailed with this description of the present invention. This process insures uniqueness of the entries in the TLB is maintained.

Figure 3:
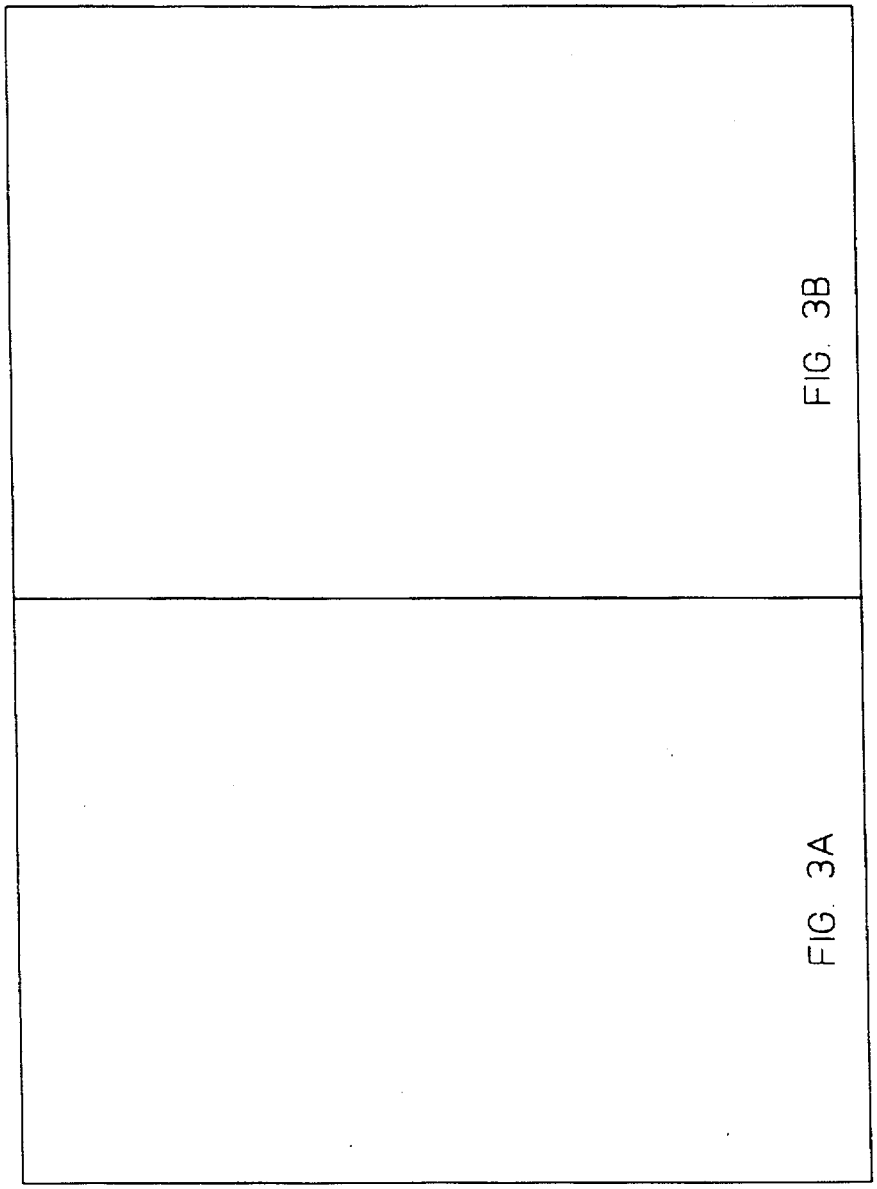
Figure 3A:
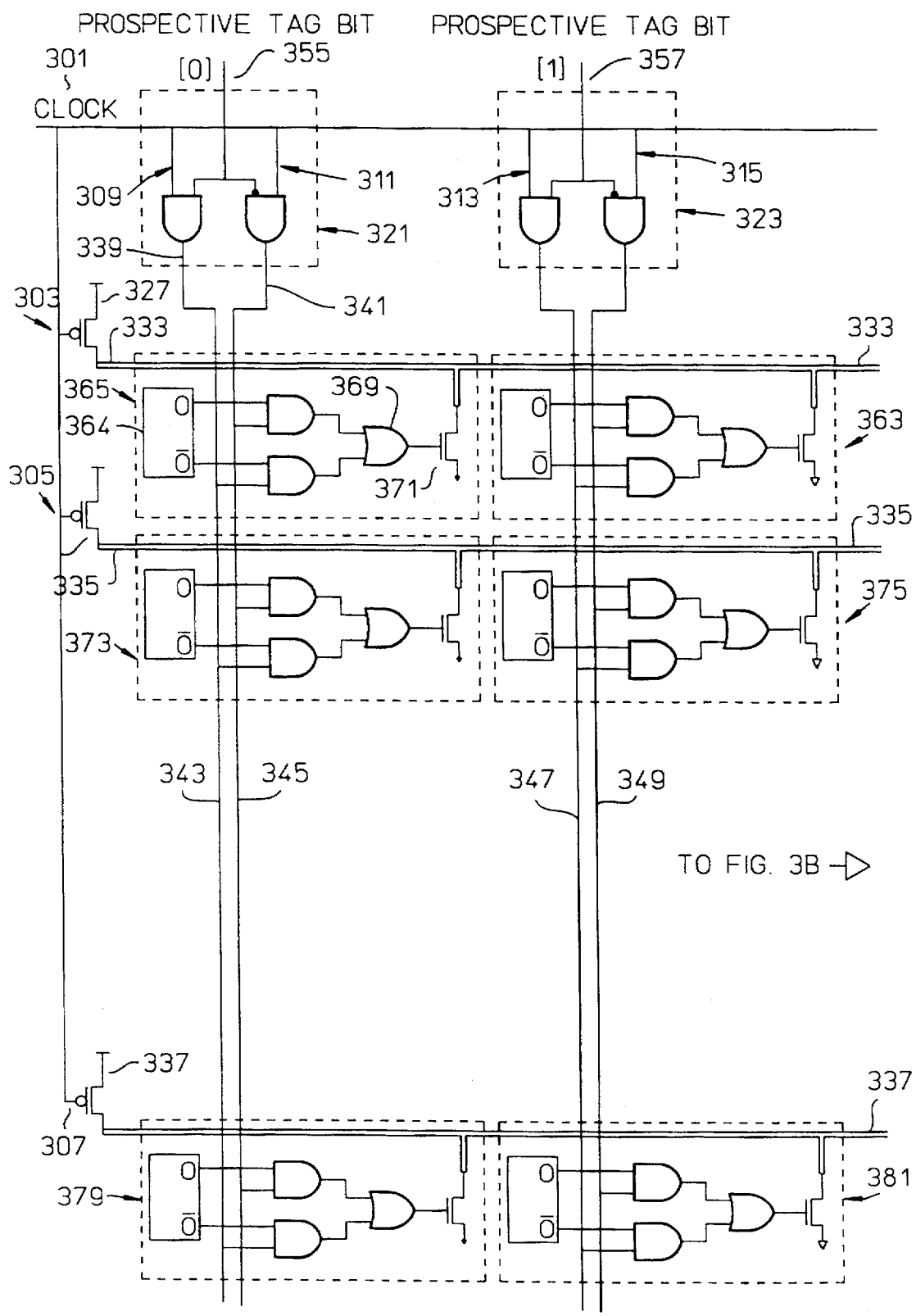
FIG. 3A shows the first two columns of the comparator array wherein FIG. 3B continues FIG. 3A to the right and shows the last column of the comparator array of FIG. 3.
Figure 3B:
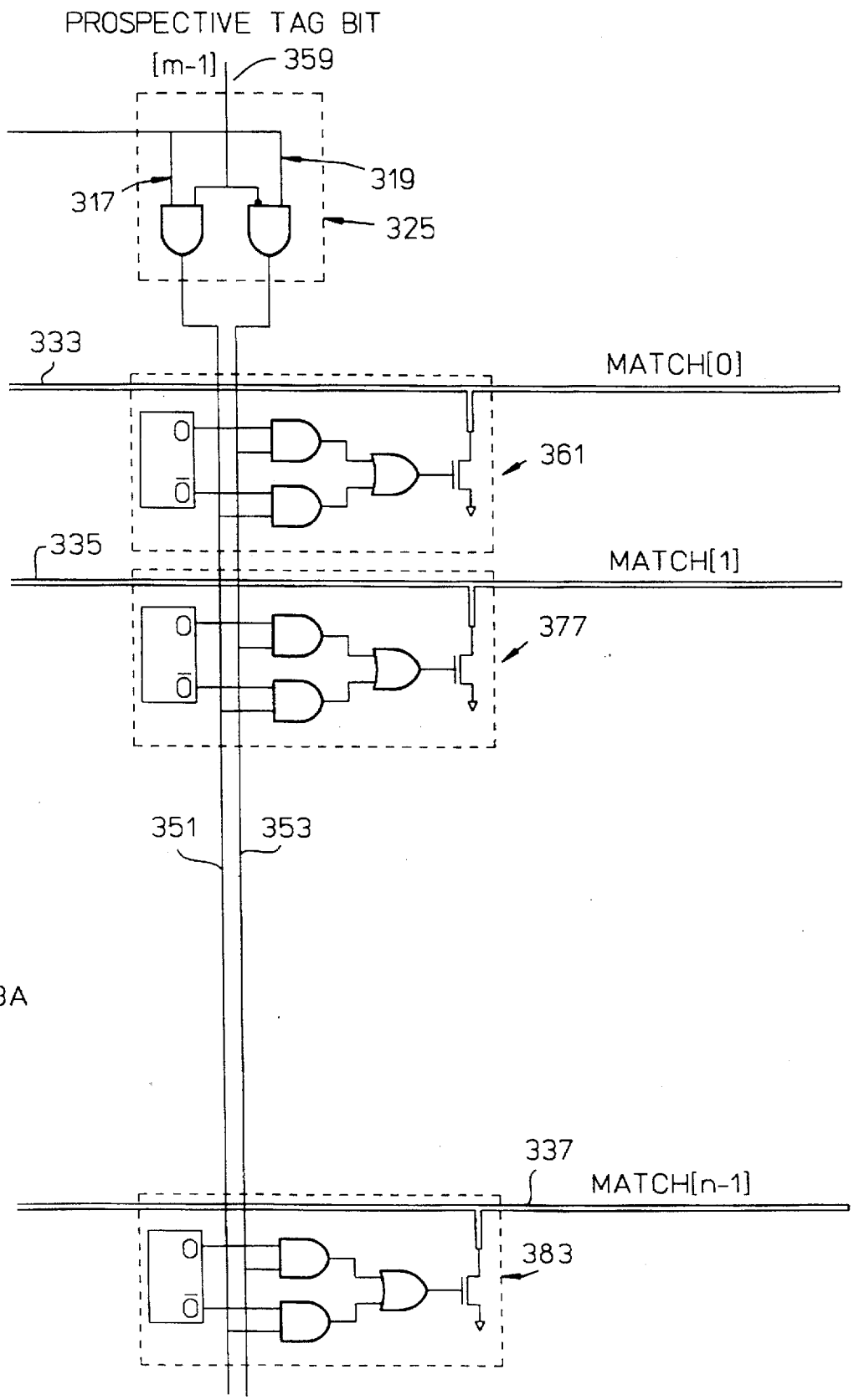

FIG. 3 illustrates a comparator array circuit to accomplish the comparison process described in association with FIG. 2. As illustrated in FIG. 3, a clock signal 301 is connected to the gates of three "match" line precharge field effect transistors (FETs) 303, 305 and 307. The clock signal 301 is also connected to two inputs of three independent gate buffers, inputs 309–311 of buffer 321, inputs 313–315 of buffer 323, and inputs 317–319 of buffer 325. The source inputs 327, 329 and 331 of each of the "match" line FETs 303, 305 and 307 respectively, is connected to a voltage source (not shown). The drain output of FET 303 is connected to match line 333. In like manner, the drains of FETs 305 and 307 are connected to match lines 335 and 337 respectively.

The gate buffer 321 has two outputs 339 and 341 one of which is connected to rail line 343 and the other of which is connected to rail line 345. The two outputs 339 and 341 are complementary when active and low when inactive. Likewise, gate buffers 323 and 325 each have two outputs which are connected to rail lines 347–349 and 351–353 respectively. Each of the gate buffers 321, 323 and 325 have a third input 355, 357 and 359 respectively which are referred to as prospective tag bit inputs.

Connected to each "match" line (333, 335 and 337) is a row of comparator networks. For example, "match" line 333 is illustrated connected to a row of three comparator networks 361, 363 and 365. Each of the comparator networks are identical in construction with the only change being which rail lines they are connected to. The construction of comparator network 365 is representative of all the other comparator networks and includes a storage register 367 a comparator circuit 369 and a "match" line discharge FET 371.

The comparator circuit 369 has four inputs with two of the inputs connected to complementary outputs from the storage register 367. Of the two remaining inputs to the comparator circuit 369, one is connected to rail bit line 343 and the other is connected to rail line 345. An output from the comparator circuit 369 controls the gate the of the "match" line discharge FET 371 such that the FET 371 is turned off if a match occurs between the two inputs connected to the storage register 367 and the two inputs connected to rail lines 343 and 345. The "match" line discharge FET 371 is connected between the "match" line 333 and a ground potential. Therefore, if the FET 371 is turned on, the "match" line is effectively at ground potential. Each storage register, of which 367 is representative, is connected to circuity to load a value into the register. For clarity, that circuitry is omitted from the illustration but is well know to those skilled in the art.

As described for "match" line 333, "match" line 335 is connected to a row of comparator networks 373, 375 and 377 while "match" line 337 is connected to a row of comparator networks 379, 381 and 383. Each row of comparator networks serves to compare a stored tag, stored as a series of bits in the respective storage registers, to a prospective tag presented as a series of bits on the respective rail lines. So while only three comparator networks are illustrated per row, in practice there will be as many comparator networks per row as bits required to make up a tag ("m" bits). For example, if tags are 12-bits long, then each "match" line will have 12 comparator networks associated with it and each comparator network will store 1-bit of the tag in its associated storage register. Likewise, while only three gate buffers 321, 323 and 325 are shown, in practice there will be as many gate buffers as bits in a tag. Also while only three "match" lines are illustrated, in practice there will be as many "match" lines, "match" line precharge FETs and associated rows of comparator networks as there are tags stored in the TLB.

The comparator array circuit operates by making a comparison each clock cycle between a prospective tag presented to inputs 355, 357 and 359 of the gate buffers and the tags stored in the rows of comparator networks. If a tag stored in a row of comparator networks matches the prospective tag, then the "match" line associated with that row of comparator networks remains high indicating a match.

For each clock cycle the following sequence of events below occurs. The clock 301 goes low. By the action of the gate buffers 321, 323 and 325, all of the associated rail lines are pulled low. Therefore all comparator circuits (369 is representative) are inactivated and their outputs are forced low. In turn, the associated "match" line discharge FETs (371 is representative) are turned off.

As all of the discharge FETs are off, the "match" line precharge FETs 303, 305 and 307 are able to precharge the "match" lines to a "high" level thereby indicating a match.

A prospective tag is presented to the gate buffers 321, 323 and 325 on inputs 355, 357 and 359. Since the clock is still low, the gate buffers prevent the bits of the prospective tag from propagating to the comparator networks. At this point the comparator array circuit is setup to perform a comparison.

The clock 301 now goes high. By this action, the gate buffers 321, 323 and 325 will drive one and only one of their associated rail lines (343 and 345 are representative) high. The other associated rail line will remain low. In addition the precharge FETs are turned off.

In response to one of the rail lines transitioning high, each of the comparator circuits (369 is representative) will compare the bit pattern on the rail lines they are connected to against the bit pattern present from the complementary outputs of their storage registers (367 is representative). If a comparator circuit detects that the bit patterns it is comparing do not match, then the "match" line discharge FET (371 is representative) associated with that comparator circuit is turned on thereby forcing the "match" line connected to the discharge FET low. Therefore if any comparator network in a row detects a non-match, then the prospective tag bit pattern did not match the tag stored in that row of comparator networks and the "match" line for that row is forced low. Conversely, if each comparator network in a row detects a match, then none of the discharge FETs associated with that row will be turned on and the "match" line associated with that row will remain high indicating a tag match.

The cycle ends here with all "match" lines that are high indicating a tag match and all "match" lines that are low indicating a tag mismatch.

The comparator array circuitry illustrated in FIG. 3 works well for TLBs which utilize uniform size pages. That is, all pages represented by a tag are the same size. However, for TLBs utilizing variable sized pages, modifications to the comparator array must be made to allow for proper conflict detection.

Figure 4:
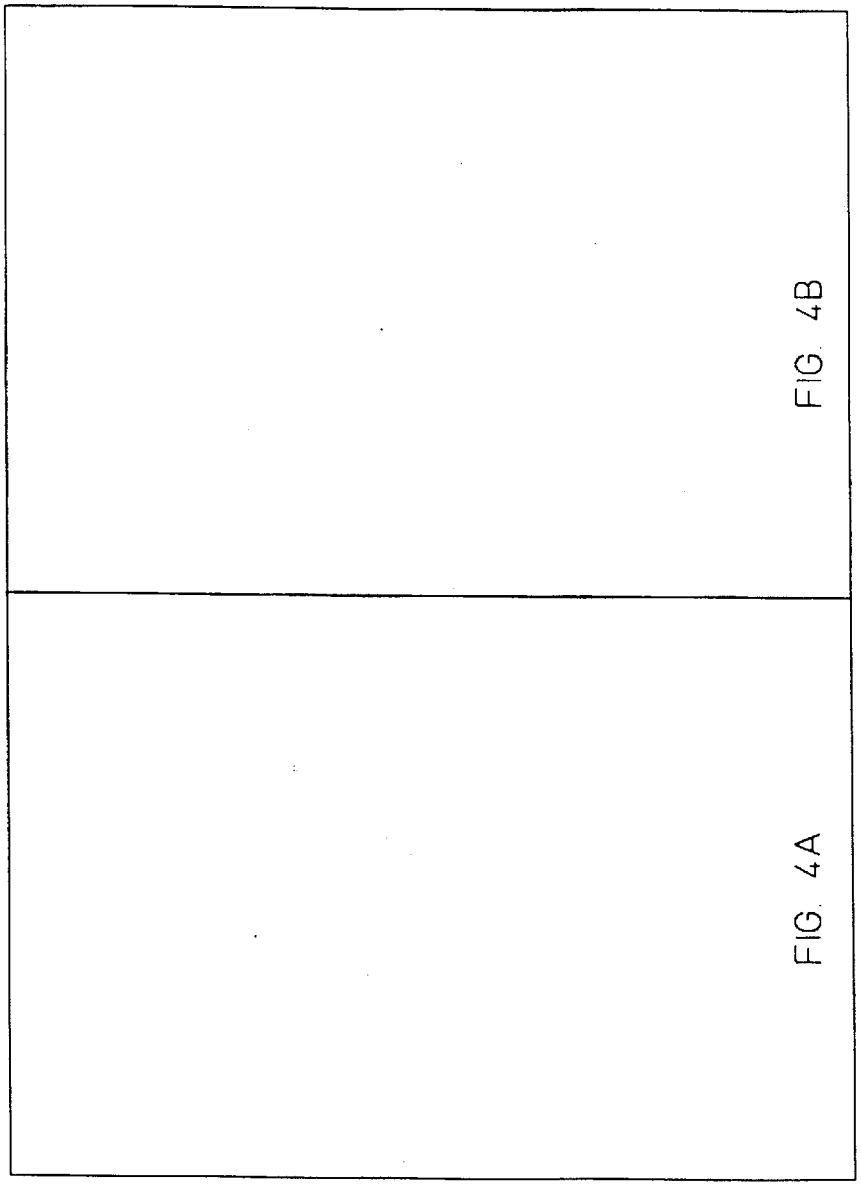
Figure 4A:
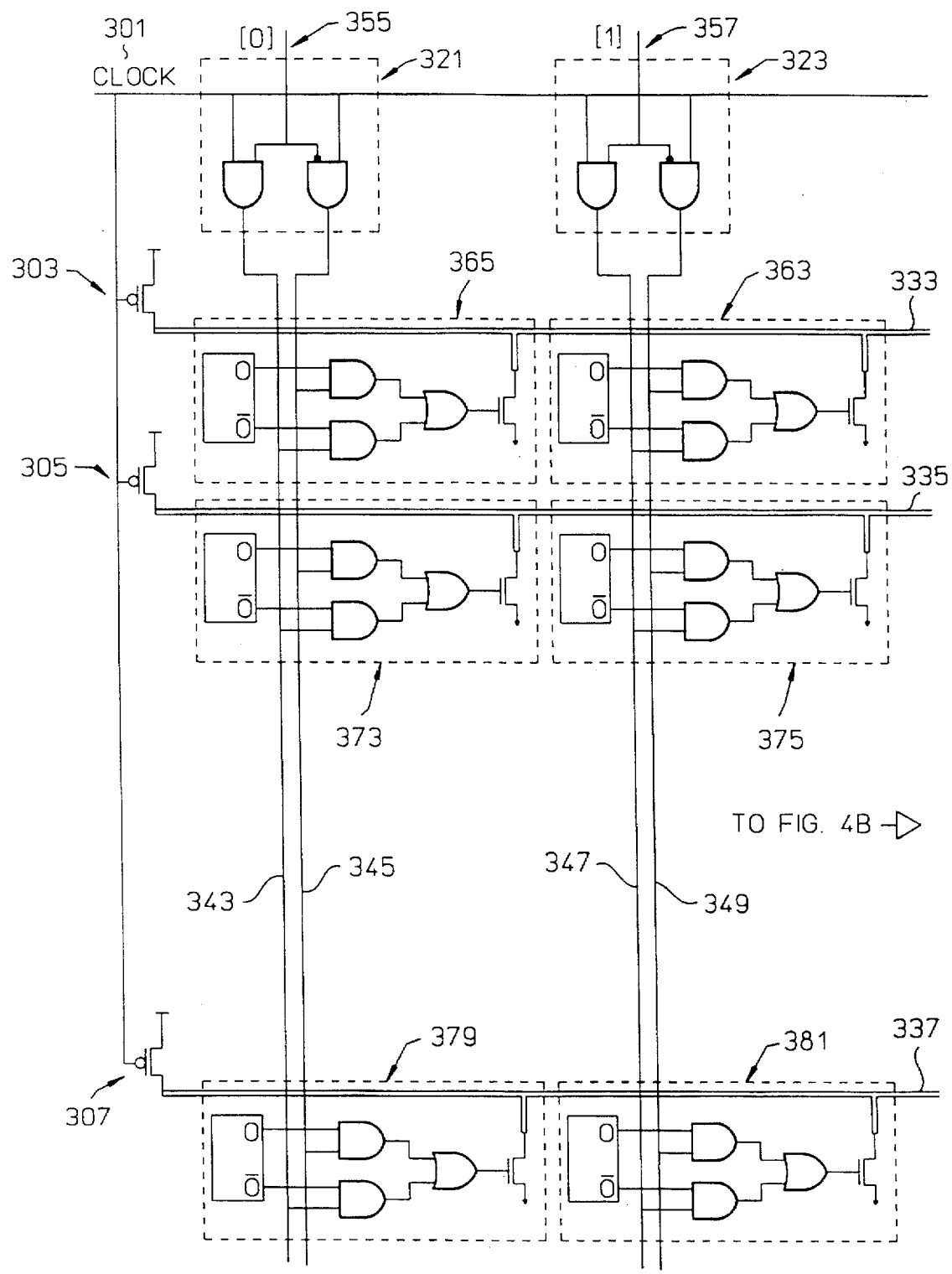
FIG. 4A shows the first two columns of the comparator array and wherein FIG. 4B continues FIG. 4A to the right and shows the last two columns of the comparator array of FIG. 4.
Figure 4B:
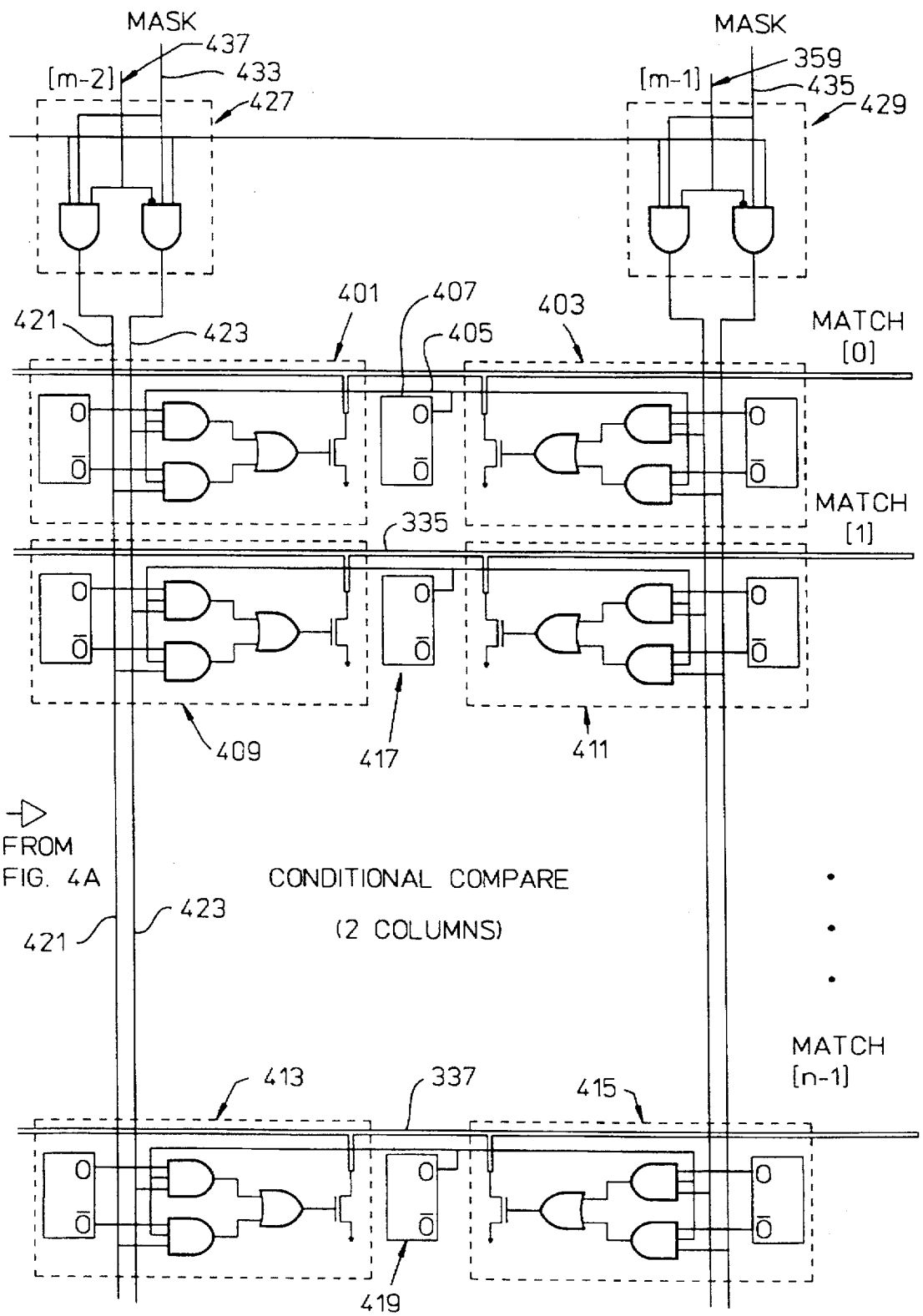

FIG. 4 illustrates the basic comparator array of FIG. 3 with modifications to allow for conflict detection between tags representing different page sizes. The modifications are two fold. First, the basic comparator circuit described in association with FIG. 3 is modified to include additional circuitry to enable or disable the comparator. The second modification is to the basic gate buffers also described in association with FIG. 3 to include an additional input which prevents activation of the associated rail lines.

The last two comparator networks 401 and 403 associated with "match" line 333 are modified to include a control input 405. A storage latch 407 is connected to the control input 405. If a "0" is stored in the storage latch 407, then the control input 405 will be "low" thereby preventing comparators 401 and 403 from indicating a mismatch. Conversely, if a "1" is stored in the storage latch 407, then the control input 405 will be "high" and thereby enabling both comparators 401 and 403 to indicate a match or mismatch as determined by the other inputs to the comparators. The circuitry required to store a bit in the storage latch 407 is not shown but is well known by those skilled in the art.

For each bit controlled by the control input 405, the effective address mapped by a TLB tag stored in the associated row of comparator networks; is increased by a power of two. In the example shown, the control input 405 disables two comparator networks 401 and 403. Therefore the address space represented by the TLB tag stored in the row of comparator networks 365, 363, 401 and 403 associated with "match" line 333 is increased by $2^2$ or 4. This is because the two least significant bits of the TLB tag will not be used in the compare operation.

The last comparator networks 409–411 and 413–415 associated with each of the other "match" lines 335 and 337 are identical to comparator networks 401–403. Storage latch 417 controls comparator networks 409–411 and storage latch 419 controls comparator networks 413–415.

Gate buffer 427 operates similarly to gate buffer 321 described in association with FIG. 3 except a mask bit input line 433 has been added. When forced "low", the mask bit input prevents the activation of either rail lines 421 or 423 when the clock line 301 transitions "high". This renders any comparator network connected to rail lines 421 and 423 incapable of producing mismatches. Gate buffer 429 is identical to gate buffer 427 and has a mask bit input 435.

The mask bit inputs 433 and 435 allow particular bits of the prospective tag to be ignored for comparison purposes.

This has the effect of allowing a prospective tag to represent a variable size page. For example, if mask bit 435 is "low", the prospective tag presented on the gate buffer inputs 355, 357, 437 and 359 now represents a page $2^1$ or twice as big as-would be the case if all the mask bit inputs are "high". If both mask bit lines 433 and 435 are low, then the prospective tag represents a page $2^2$ or four times as large as is the case if all mask bit lines are "high". Since there is only one control register per "match" line, as a practical matter, both of the mask bit lines 433 and 435 would be connected together so that the prospective tag is variable by a power of four.

In operation, both the base address and the size of the page to be inserted into the TLB must be known at insertion time. The size is specified in terms of a mask (field of bits) which is the same mask that will be written into the storage latches (405 is representative) at the completion of the TLB insertion process. That is, the prospective tag becomes a TLB tag stored in the storage registers of the comparator networks and the mask is stored in the control registers to delimit the size the TLB tag represents.

The operation of the mask will be made more clear by reference to the following chart and description. For this chart it is assumed that the address range of the computer is 4-gigabytes and the minimum page size is 4-kilobytes. Also it is assumed for this chart that the five least significant bit comparators per "match" line are individually controlled by a control register so that the tags stored in the TLB are variable by powers of two. Therefore there will be five control registers per "match" line. For comparison, the circuit illustrated in FIG. 4 utilized one control register per "match" line.

| Size | Mask  | Base (byte address) |      |      |      |      |      |      |      |
|------|-------|------|------|------|------|------|------|------|------|
| 4K   | 11111 | aaaa | aaaa | aaaa | aaaa | aaaa | 0000 | 0000 | 0000 |
| 8K   | 11110 | aaaa | aaaa | aaaa | aaaa | aaax | 0000 | 0000 | 0000 |
| 16K  | 11100 | aaaa | aaaa | aaaa | aaaa | aaxx | 0000 | 0000 | 0000 |
| 32K  | 11000 | aaaa | aaaa | aaaa | aaaa | axxx | 0000 | 0000 | 0000 |
| 64K  | 10000 | aaaa | aaaa | aaaa | aaaa | xxxx | 0000 | 0000 | 0000 |
| 128K | 00000 | aaaa | aaaa | aaaa | aaax | xxxx | 0000 | 0000 | 0000 | a: Address bit (compare)
x: Don't care bit (don't compare)
0: Byte offset address (don't compare)

As the chart illustrates, the most significant 20-bits form the virtual address tag. The mask bits are used to adjust how many of the 20-bits are used in the insertion conflict compare process. In this example, it is assumed that the mask bits mask the five least significant tag bits. If the prospective tag represents the minimum size memory page (4K), then all the mask bits will be "1s" thereby enabling all the gate buffers. If the prospective tag represents the maximum size memory page (128K), then all the mask bits will be "0s" thereby preventing the gate buffers associated with the five least significant tag bits from activating their associated rail lines.

The implementation illustrated in FIG. 4 limits the page sizes to either 4K or 16 k due to their being only one control register 407, 417 and 419 per "match" line 333, 335 and 337 and the fact that the two least significant bit comparator networks per "match" line are controlled by the same control register. However, the circuit is modifiable to have as many control registers as there are bits in a tag. For example, if the 5 least significant bit comparator networks per "match" line are controlled by independent control registers, then any page size that is 4K in size or a power of two bigger (upto 128K) can be compared and stored in the TLB.

By utilizing the mask inputs and storing appropriate values in the control registers, variable sized prospective tags can be compared against variable sized TLB tags to detect all conflicts. This comparison circuit and process produces fast and efficient conflict results thereby improving the performance of the associated computer system.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

I claim:

1. In a digital computing system of the type having a virtual address generating device and a translation memory (TLB) for storing entries containing virtual address information used in mapping virtual addresses from the virtual address generating device into corresponding physical addresses which identify portions of a main memory associated with the digital computing system, a device for detecting conflicts between a prospective virtual address entry and a current TLB entry, comprising:

a comparator device for simultaneously comparing a prospective virtual address to all virtual entries in the translation memory;

the comparator producing a match signal having one of an active state and an inactive state, where the match signal is in the active state in response to the comparator device detecting a match between the prospective virtual address and any of the virtual addresses in the translation memory; and a mask device to mask zero or more bits which make up the prospective virtual address, such that the number of bits of said prospective virtual address are adjusted by said mask based on the size of page that the prospective virtual address entry represents to generate a prospective virtual address entry tag, said mask device also operative to mask zero or more bits that make up a current TLB virtual address tag associated with each of said current TLB entries, such that the number of bits of said current TLB virtual address tag are adjusted based on the size of page represented by its associated current TLB entry, and such that the number of bits simultaneously compared by said comparator is adjusted by said mask;

whereby, when the comparator device simultaneously compares the prospective virtual address to the virtual address in the translation memory, only the bits of the prospective virtual address which are not masked affect the state of the match signal.

2. A digital computing system as in claim 1 further comprising:

a virtual address comparison adjustment device, associated with a virtual address in the translation memory, to disable zero or more bits which make up the virtual address; and whereby only virtual address bits which are enabled affect the state of the match signal.

3. A digital computing system as in claim 1 wherein:

the mask device includes a digital gate and the digital gate includes a mask bit input line having one of an active and an inactive state; and whereby, when the mask bit input line is inactive, a prospective virtual address bit associated with the digital gate is compared to a virtual address bit in the translation memory.

4. A digital computing system as in claim 1 wherein:

the mask device includes a digital gate for each bit of the prospective virtual address which is maskable and each of the digital gates includes a mask bit input line having one of an active and an inactive state; and whereby, only the bits of the prospective virtual address associated with digital gates having inactive mask bit input lines affect the state of the match signal.

5. In a digital computing system of the type having a virtual address generating device and a translation memory (TLB) for storing entries containing virtual address information used in mapping virtual addresses from the virtual address generating device into corresponding physical addresses which identify portions of a main memory associated with the digital computing system, a device for detecting conflicts between a prospective virtual address entry and a current TLB entry, comprising:

- a comparator device for simultaneously comparing a prospective virtual address bit to bits of virtual address entries in the translation memory, where the comparator device includes a storage register for storing a bit of a virtual address;

- the comparator producing a match signal having one of an active state and an inactive state, where the match signal is in the active state in response to the comparator device detecting a match between the prospective virtual address bit and the bit of the virtual addresses stored in the storage register;

- a mask device including a digital gate which gates the prospective virtual address bit, the digital gate including a mask bit input line having one of an active state and an inactive state such that when the mask bit input line is in the active state the match signal is in the inactive state, such that the number of bits of said prospective virtual address are adjusted by said mask based on the size of page that the prospective virtual address entry represents to generate a prospective virtual address entry tag, and the number of bits that make up a current TLB virtual address tag associated with each of said current TLB entries are adjusted by said mask based on the size of page represented by said associated current TLB entry, such that the number of bits simultaneously compared by said comparator is adjusted by said mask; and

- the match signal is on the active state in response to the comparator device detecting a match between the prospective virtual address bit and the bit of the virtual address stored in the storage register unless the mask device is active.

6. A digital computing system as in claim 5 wherein:

the mask device includes a virtual address comparison adjustment device, associated with the bit of the virtual address stored in the storage register, operative to keep the match signal in the inactive state in response to the comparator device detecting a match between the prospective virtual address bit and the bit of the virtual address stored in the storage register.

7. A digital computing system as in claim 5 further comprising:

- a plurality of additional comparator devices each comparing a unique one of a plurality of prospective virtual address bits to a unique one of a plurality of bits of a virtual address entry in the translation memory;

- a plurality of additional comparator outputs, in a one to one correspondence with the additional comparator devices with each output having one of an active and an inactive state;

- the mask device including a plurality of digital gates in a one to one correspondence to the plurality of unique bits of the prospective virtual address and each digital gate having a mask input line with an active state; and

- each of the plurality of additional comparator outputs is in the active state in response to the associated additional comparator detecting a match between a bit of the prospective virtual address and a bit of the virtual address entry unless the associated mask input line of the associated digital gate is in the active state.

* * * * *